US010222242B2

(12) United States Patent
van de Kerkhof

(10) Patent No.: US 10,222,242 B2
(45) Date of Patent: Mar. 5, 2019

(54) ENCODERS, ENCODING METHODS AND SYSTEMS AND DEVICES USING THEM

(71) Applicant: Ernst van de Kerkhof, Sittard (NL)

(72) Inventor: Ernst van de Kerkhof, Sittard (NL)

(73) Assignee: PerkinElmer Health Sciences, Inc., Waltham, MA (US)

( * ) Notice: Subject to any disclaimer, the term of this patent is extended or adjusted under 35 U.S.C. 154(b) by 81 days.

(21) Appl. No.: 15/143,814

(22) Filed: May 2, 2016

(65) Prior Publication Data

US 2016/0320212 A1    Nov. 3, 2016

Related U.S. Application Data

(60) Provisional application No. 62/155,392, filed on Apr. 30, 2015, provisional application No. 62/156,252, filed on May 2, 2015, provisional application No. 62/161,611, filed on May 14, 2015.

(51) Int. Cl.
*G01D 5/347* (2006.01)
*G01D 5/249* (2006.01)
*G01D 5/246* (2006.01)

(52) U.S. Cl.
CPC ............ *G01D 5/347* (2013.01); *G01D 5/246* (2013.01); *G01D 5/2497* (2013.01); *G01D 5/34792* (2013.01)

(58) Field of Classification Search
CPC ...... G01D 5/347; G01D 5/246; G01D 5/2497; G01D 5/34792
See application file for complete search history.

(56) References Cited

U.S. PATENT DOCUMENTS

| 6,483,104 B1 | 11/2002 | Benz |
| 9,041,385 B2 * | 5/2015 | Kirste ................. G01D 5/2455 324/207.22 |
| 2002/0053244 A1 | 5/2002 | Goenner |
| 2012/0283986 A1 | 11/2012 | Veeraraghavan |

FOREIGN PATENT DOCUMENTS

| CN | 102322882 | 1/2012 |
| DE | 4436784 | 4/1995 |
| FR | 2495327 | 6/1982 |
| WO | 2013182644 | 12/2013 |

OTHER PUBLICATIONS

ISR/WO for PCT/IB2016/000566 dated Sep. 26, 2016.
Search Report for PCT/IB2016/000565 dated Sep. 6, 2016.

* cited by examiner

*Primary Examiner* — Tony Ko
(74) *Attorney, Agent, or Firm* — Rhodes IP PLC; Christopher R. Rhodes

(57) ABSTRACT

Certain configurations described herein are directed to encoders and encoding methods. In some instances, an encoder can be used with an article support to identify an absolute position of the article support based on reading the code of the encoder.

20 Claims, 13 Drawing Sheets

| $N_c$ | $N_e$ | $N_u$ | $r_i$ | $r_a$ | $N_e$ | $N_u$ | $r_i$ | $r_a$ | $N_e$ | $N_u$ | $r_i$ | $r_a$ |
|---|---|---|---|---|---|---|---|---|---|---|---|---|
| 1 | 4 | 6 | 0.3333 | 0.3333 | 6 | 12 | 0.2500 | 0.2500 | 8 | 20 | 0.2000 | 0.2000 |
| 2 | 8 | 12 | 0.1667 | 0.3333 | 18 | 36 | 0.0833 | 0.1667 | 32 | 80 | 0.0500 | 0.1000 |
| 3 | 16 | 24 | 0.0833 | 0.2500 | 54 | 108 | 0.0278 | 0.0833 | 128 | 320 | 0.0125 | 0.0375 |
| 4 | 32 | 48 | 0.0417 | 0.1667 | 162 | 324 | 0.0093 | 0.0370 | 512 | 1280 | 0.0031 | 0.0125 |
| 5 | 64 | 96 | 0.0208 | 0.1042 | 486 | 972 | 0.0031 | 0.0154 | 2048 | 5120 | 0.0008 | 0.0039 |
| 6 | 128 | 192 | 0.0104 | 0.0625 | 1458 | 2916 | 0.0010 | 0.0062 | 8192 | 20480 | 0.0002 | 0.0012 |
| 7 | 256 | 384 | 0.0052 | 0.0365 | 4374 | 8748 | 0.0003 | 0.0024 | 32768 | 81920 | 5E-05 | 0.0003 |
| 8 | 512 | 768 | 0.0026 | 0.0208 | 13122 | 26244 | 0.0001 | 0.0009 | 131072 | 327680 | 1E-05 | 0.0001 |
|   |   | 2 |   |   |   | 3 $N_s$ |   |   |   | 4 |   |   |

FIG. 3

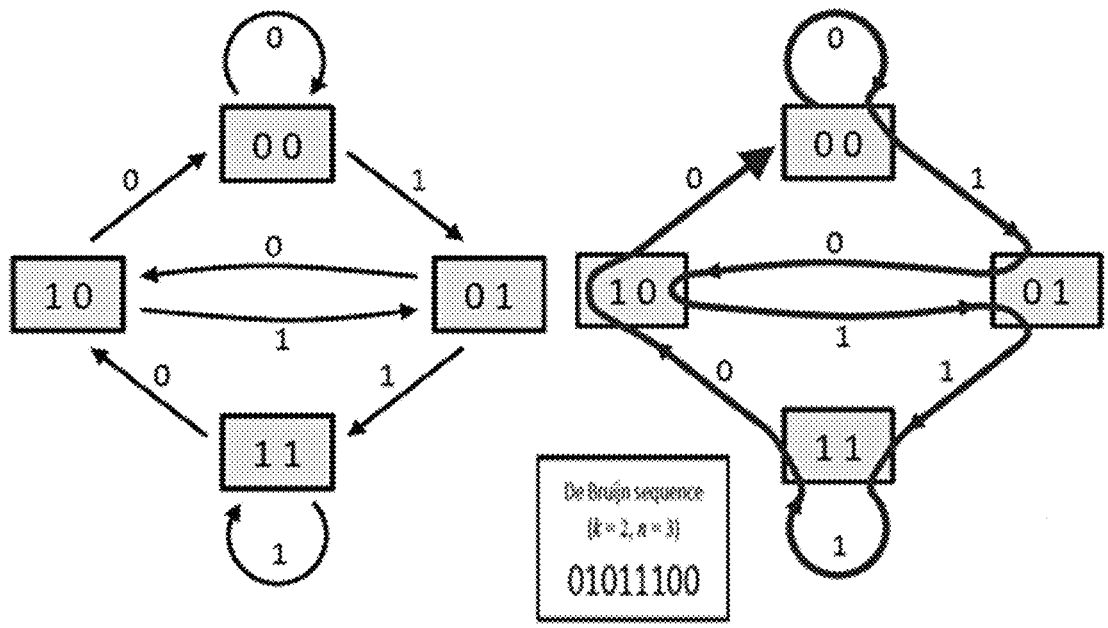
FIG. 4A
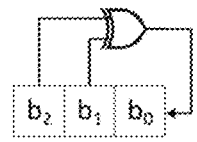
FIG. 4B
FIG. 5A
FIG. 5B

Position Encoding

Length Encoding odd code block even code block

| | | | | | | | | | | | | | | |
|---|---|---|---|---|---|---|---|---|---|---|---|---|---|---|
| | 73 | 1 | 0101110 | 46 | 74 | 2 | 1011100 | | 193 | 2 | 1011100 | 92 | 194 | 1 | 0111000 | 56 |
| | 75 | 1 | 0111000 | 56 | 76 | 2 | 1110001 | 113 | 195 | 2 | 1110001 | 113 | 196 | 2 | 1100010 | 98 |
| | 77 | 2 | 1100010 | 98 | 78 | 2 | 1000101 | 69 | 197 | 2 | 1000101 | 69 | 198 | 1 | 0001010 | 10 |
| | 79 | 1 | 0001010 | 10 | 80 | 1 | 0010101 | 21 | 199 | 1 | 0010101 | 21 | 200 | 1 | 0101011 | 43 |
| | 81 | 1 | 0101011 | 43 | 82 | 2 | 1010110 | 86 | 201 | 2 | 1010110 | 86 | 202 | 1 | 0101100 | 44 |
| 4 | 83 | 1 | 0101100 | 44 | 84 | 2 | 1011001 | 89 | 8 | 203 | 2 | 1011001 | 89 | 204 | 1 | 0110011 | 51 |
| | 85 | 1 | 0110011 | 51 | 86 | 2 | 1100110 | 102 | 205 | 2 | 1100110 | 102 | 206 | 2 | 1001101 | 77 |
| | 87 | 2 | 1001101 | 77 | 88 | 1 | 0011010 | 26 | 207 | 1 | 0011010 | 26 | 208 | 1 | 0110101 | 53 |
| | 89 | 1 | 0110101 | 53 | 90 | 2 | 1101010 | 106 | 209 | 2 | 1101010 | 106 | 210 | 2 | 1010100 | 84 |
| | 91 | 2 | 1010100 | 84 | 92 | 1 | 0101000 | 40 | 211 | 1 | 0101000 | 40 | 212 | 2 | 1010001 | 81 |
| | 93 | 2 | 1010001 | 81 | 94 | 1 | 0100011 | 35 | 213 | 1 | 0100011 | 35 | 214 | 2 | 1000110 | 70 |
| | 95 | 2 | 1000110 | 70 | 96 | 1 | 0001100 | 12 | 215 | 1 | 0001100 | 12 | 216 | 1 | 0011000 | 24 |
| | 97 | 1 | 0011000 | 24 | 98 | 1 | 0110001 | 49 | 217 | 1 | 0110001 | 49 | 218 | 2 | 1100011 | 99 |
| | 99 | 2 | 1100011 | 99 | 100 | 2 | 1000111 | 71 | 219 | 2 | 1000111 | 71 | 220 | 1 | 0001111 | 15 |
| | 101 | 1 | 0001111 | 15 | 102 | 1 | 0011110 | 30 | 221 | 1 | 0011110 | 30 | 222 | 1 | 0111100 | 60 |
| | 103 | 1 | 0111100 | 60 | 104 | 2 | 1111001 | 121 | 223 | 2 | 1111001 | 121 | 224 | 2 | 1110010 | 114 |
| | 105 | 2 | 1110010 | 114 | 106 | 2 | 1100101 | 101 | 225 | 2 | 1100101 | 101 | 226 | 2 | 1001010 | 74 |
| 5 | 107 | 2 | 1001010 | 74 | 108 | 1 | 0010100 | 20 | 10 | 227 | 1 | 0010100 | 20 | 228 | 1 | 0101001 | 41 |
| | 109 | 1 | 0101001 | 41 | 110 | 2 | 1010010 | 82 | 229 | 2 | 1010010 | 82 | 230 | 1 | 0100101 | 37 |
| | 111 | 1 | 0100101 | 37 | 112 | 2 | 1001011 | 75 | 231 | 2 | 1001011 | 75 | 232 | 1 | 0010110 | 22 |
| | 113 | 1 | 0010110 | 22 | 114 | 1 | 0101101 | 45 | 233 | 1 | 0101101 | 45 | 234 | 2 | 1011010 | 90 |
| | 115 | 2 | 1011010 | 90 | 116 | 1 | 0110100 | 52 | 235 | 1 | 0110100 | 52 | 236 | 2 | 1101000 | 104 |
| | 117 | 2 | 1101000 | 104 | 118 | 2 | 1010000 | 80 | 237 | 2 | 1010000 | 80 | 238 | 1 | 0100000 | 32 |
| | 119 | 1 | 0100000 | 32 | 120 | 2 | 1000000 | 64 | 239 | 2 | 1000000 | 64 | 240 | 1 | 0000000 | 0 |

FIG. 13

ENCODERS, ENCODING METHODS AND SYSTEMS AND DEVICES USING THEM

RELATED APPLICATION

This application is related to, and claims priority to and the benefit of, each of U.S. Provisional Application No. 62/155,392 filed on Apr. 30, 2015, U.S. Provisional Application No. 62/156,252 filed on May 2, 2015, and U.S. Provisional Application No. 62/161,611 filed on May 14, 2015 the entire disclosure of each of which is hereby incorporated herein by reference for all purposes.

TECHNOLOGICAL FIELD

Certain embodiments described herein are related to encoders and encoding methods and systems and devices using them. More particularly, certain embodiments described herein are directed to encoders comprising distinguishable elements arranged on a support, in which the length of the distinguishable elements is used to determine a code.

SUMMARY

Certain aspects described herein are directed to encoders which can be used to determine a position on an associated support device.

In one aspect, a device for encoding comprising a plurality of arranged distinguishable elements on a support, in which the distinguishable elements can be detected and used to identify a discrete position based on a code generated for a subset of the plurality of arranged distinguishable features on the support, in which each of the plurality of arranged distinguishable elements comprises an independent defined length that is used to generate the code is provided.

In certain embodiments, the codes are divided into two interweaved subsets. In other embodiments, one of the two interweaved subsets is an odd subset and the other of the two interweaved subset is an even subset. In further examples, each code generated for the odd subset is a unique code. In additional examples, the code generated for the subset is generated using a De Bruijn sequence. In some examples, the code generated for the subset is generated using two interweaved De Bruijn sequences. In further examples, the two interweaved De Bruijn sequences are of equal length. In other embodiments, the code generated for the subset is generated using an interweaved De Bruijn graph and by removing a set of closed loops with a combined length. In some examples, the code corresponds to a selected position of a device associationally coupled device. In other examples, the selected position is a sample holding position of an autosampler tray. In further examples, the distinguishable features are lines and gaps and the code is assigned based on the length of the lines and the gaps on the support. In some embodiments, the lines are configured to block an optical signal and the gaps are configured to permit passage of an optical signal. In certain examples, the length of time the optical signal is blocked and passed is used to determine the code of the subset, e.g., the number of steps of the motor is counted, which corresponds to a fixed passage of time. In other examples, a first length of the optical signal is defined as a 0 in the code and a second length of the optical signal, greater than the first length of the optical signal, is defined as a 1 in the code. In some examples, the device comprises a single detector configured to read the code by detecting the distinguishable features on the support. In additional embodiments, lines and gaps are present on the support in a defined pattern to provide the subset of distinguishable features. In some instances, the single detector is an optical detector, e.g., comprises optocoupler. In other instances, the detector is configured to receive light when a gap is positioned adjacent to the detector and is configured to not receive light when a line is positioned adjacent to the detector. In some embodiments, the support is configured as a metal plate, a plastic plate, a glass plate, a ceramic plate, a linear support, a C-shaped support or a support comprising a metal, plastic, glass, rigid or flexible material.

In another aspect, an encoder comprising an array of distinguishable elements of varying length present on a support, in which the varying length of the distinguishable elements is used to generate a code for a subset of the array of distinguishable elements is provided.

In certain examples, the subset of the array comprises at least two distinguishable elements. In other examples, the subset of the array comprises at least five distinguishable elements. In certain embodiments, the subset of the array comprises at least seven distinguishable elements. In some examples, at least one of the distinguishable elements is a gap present on the support. In other configurations, at least one of the distinguishable elements is a line or notch present on the support. In some embodiments, an additional distinguishable element is a gap present on the support. In further examples, the length of the notch or line and the length of the gap can be varied to provide a different code. In some examples, the distinguishable features are arranged linearly on the support. In certain examples, the support is configured as a support that can move rotationally or linearly.

In some instances, the support comprises two or more lanes each comprising an array of distinguishable elements of varying length. In certain examples, at least one of the distinguishable elements in each lane of the support comprises a line or notch. In further examples, at least one of the distinguishable elements in each lane of the support comprises a gap. In some embodiments, at least one additional distinguishable element in each lane of the support comprises a line or notch. In certain examples, the code provided by the subset of the distinguishable elements provides a discrete position of a device associationally coupled to the encoder. In some embodiments, the encoder is configured to determine a position of an article on the associationally coupled device without calibration of the associationally coupled device. In additional examples, the encoder is configured for use in a harsh environment. In further examples, the encoder is configured for use at a temperature above 100 degrees Celsius, above 200 degrees Celsius, or above 300 degrees Celsius. In some examples, the at least one of the distinguishing elements comprises a linear length of about 0.9 mm. In certain embodiments, another of the distinguishing elements comprises a linear length of about 1.8 mm. In some examples, the encoder is present in an instrument configured to perform one or more of thermal analysis, thermal gravimetric analysis, chromatography, gas chromatography, liquid chromatography, optical absorption, optical transmittance, mass spectrometry, an instrument comprising an atomization source, an instrument comprising an ionization source, an instrument comprising a flame, an instrument comprising a plasma and combinations thereof. In other examples, the encoder is present in a package sorting system. In certain embodiments, the encoder is present in a vehicle comprising a plurality of individual compartments. In other examples, the encoder is present in a packaging system to identity a position of at least one component to be placed into a package. In some examples, the encoder is present in a pick and place device. In further examples, the support is configured as a linear plate. In certain embodiments, the distinguishable features are machined, etched, deposited, laser-inscribed or otherwise disposed onto the linear plate. In additional examples, the encoder is configured as a plate designed to rotate In some embodiments, the distinguishable features are machined, etched, deposited, laser-inscribed or otherwise disposed onto the plate. In some instances, the encoder may comprise two or more lanes on the support, in which each lane comprises an array of distinguishable elements of varying length.

In an additional aspect, an encoder comprises a support transparent to a sensor signal, the support further comprising markings effective to block the sensor signal and disposed on the support to provide a pattern of markings separated by gaps of the support material, in which the markings and the gaps together provide an array of distinguishable elements of varying length present on the support, in which the varying length of the markings and gaps is used to generate a code for a subset of the array of marking and gaps.

In certain embodiments, the subset of the array comprises at least two, at least five or at least seven distinguishable elements. In other embodiments, the length of the markings and the length of the gaps can be varied to provide a different code. In further embodiments, the distinguishable elements are arranged linearly on the support. In other instances, the support is configured as a support that can move rotationally or linearly. In some examples, the support comprises two or more lanes each comprising an array of distinguishable elements of varying length. In other examples, the code provided by the subset of the distinguishable elements provides a discrete position of a device associationally coupled to the encoder. In some embodiments, the at least one of the distinguishable elements comprises a linear length of about 0.9 mm. In other embodiments, another of the distinguishing elements comprises a linear length of about 1.8 mm. In further examples, the encoder is configured for use in a harsh environment.

In another aspect, a method of assigning a code based on length of distinguishable features present in a subset of a support, the method comprising detecting a length of each distinguishable feature present in the subset and assigning a code based on the length of the detected distinguishable features is provided.

In certain embodiments, the method comprises configuring each subset of a region of the support with a different arrangement of distinguishable features to provide a unique code for each subset present in the region of the support. In some examples, the method comprises configuring a subset in a different region of the support with the same code as a subset present in the region. In other examples, the method comprises configuring each subset present on the support with a different arrangement of distinguishable features to provide a unique code for each subset present on the support. In some embodiments, the method comprises configuring the distinguishable features to comprise notches. In certain examples, the method comprises configuring the distinguishable features to comprise lines. In some examples, the method comprises configuring the distinguishable features to comprise notches. In certain embodiments, the method comprises using two interweaved De Bruijn sequences to assign the code to the subset. In some examples, the method comprises configuring each subset with at least three distinguishable features to provide a 3-digit code. e.g., a 3-bit binary code. In other examples, the method comprises configuring each subset with at least seven distinguishable features to provide a 7-digit code, e.g., a 7-bit binary code, or a 12 digit code.

In an additional aspect, a method of determining a discrete position of an article support comprising detecting a length of a subset of distinguishable features on an encoder support to determine a code of the detected distinguishable features and to determine a position of the article support associated with the determined code of the encoder is described.

In certain examples, the method comprises comprising coupling each of a plurality of codes of the encoder with a single position on the article support to permit determination of the position of the article support. In other examples, the method comprises detecting the length of notches and gaps as the distinguishable features on the encoder. In some embodiments, the method comprises detecting the length of at least seven linearly arranged notches and gaps in the subset to determine the code of the subset. In other examples, the method comprises assigning notches or gaps of a first length a code of 0 and assigning notches or gaps of a second length, greater than the first length, a code of 1. In certain embodiments, the method comprises configuring a plurality of different subsets within a selected sector or region of the encoder support to provide a unique code for each subset within the selected sector or region. In other embodiments, the method comprises duplicating the code of a subset present in the selected sector or region in a different selected sector or region of the encoder support. In some instances, the method comprises configuring the code as an odd code where an outer bit represents a notch on the encoder support. In some examples, the method comprises configuring the code as an even code where an outer bit represents a gap on the encoder support. In additional examples, the method comprises configuring each subset with notches and gaps to provide a 7-digit code, e.g., a 7-bit binary number as the code, in which a bit of zero corresponds to a length of 1 unit and a bit of 1 corresponds to a length of 2 units.

In another aspect, a system comprises an article support coupled to an actuation device configured to move the article support in selected increments to move the article support from a first position to a second position, and an encoder coupled to the actuation device, in which the encoder and the article support are associationally coupled such that movement of the article support from the first position to the second position causes movement of the encoder by about a same number of increments used to move the article support from the first position to the second position, in which the encoder comprises an array of distinguishable elements of varying length present on an encoder support, in which the varying length of the distinguishable elements is used to generate a code for a subset of the array of distinguishable elements, in which each generated code is associated with a position of the article support to permit reading of the code and determination of an exact position of the article support.

In certain examples, the actuation device is configured as a stepper motor. In some examples, the stepper motor is configured to rotate the article support and the encoder. In certain embodiments, the stepper motor is configured to linearly translate the article support and the encoder. In other embodiments, the system comprises a sensor configured to detect the code of the subset of the encoder support. In some examples, the sensor is configured as an optical sensor. In further embodiments, the encoder support comprises an arrangement of notches and gaps for the subset, in which the notches are configured to block receipt of light by the sensor and the gaps are configured to permit passage of light to the sensor, in which the blockage and receipt of light by the sensor are used to determine the length of the notches and gaps present in the subset of the encoder support. In certain examples, the encoder support comprises a plurality of regions or sectors. In other examples, each subset of distinguishable features present in a region or sector of the encoder support are arranged to provide a unique code. In some examples, the encoder support is configured as a plate comprising at least one of a metal, a glass, a plastic and combinations thereof. In other examples, the sensor is configured as a magnetic sensor. In certain embodiments, the system comprises a second actuation device coupled to the article support. In some examples, the second actuation device is configured to move the article support up and down and the actuation device is configured to move the article support rotationally or linearly. In other examples, the encoder is coupled to the actuation device in a plane below the article support. In additional examples, the encoder is coupled to the actuation device in a plane above the article support. In certain examples, the article support and encoder are configured for use in a system where the article support receives packages in a package sorting system. In some embodiments, the article support and encoder are configured for use in a packaging system to identity a position of at least one component to be placed into a package. In certain instances, the article support and encoder are configured for use in a pick and place device. In some examples, the article support and encoder are configured for use in an instrument configured to perform one or more of thermal analysis, thermal gravimetric analysis, chromatography, gas chromatography, liquid chromatography, optical absorption, optical transmittance, mass spectrometry, an instrument comprising an atomization source, an instrument comprising an ionization source, an instrument comprising a flame, an instrument comprising a plasma and combinations thereof. In other examples, the encoder comprises a first lane and a second lane each comprising an array of distinguishable elements of varying length present on an encoder support.

In another aspect, an encoder comprising an optically transparent support and a plurality of notches disposed on the optically transparent support to provide a subset of an array of distinguishable elements of varying length present on a support, in which the varying length of the distinguishable elements is used to generate a code for a subset of the array of distinguishable elements.

In certain embodiments, the subset of the array comprises at least five distinguishable elements. In some examples, the subset of the array comprises at least seven distinguishable elements. In certain examples, space between the notches disposed on the optically transparent support function as gaps which are read to generate the code. In other examples, the distinguishable elements or features are arranged linearly on the support. In certain embodiments, the support is configured as a support that can move rotationally or linearly and be read. In some examples, the support comprises two or more lanes each comprising disposed notches that provide a subset of an array of distinguishable elements of varying length. In certain examples, the code provided by the subset of the distinguishable elements provides a discrete position of a device spatially coupled to the encoder. In other examples, the at least one of the distinguishing elements comprises a linear length of about 0.9 mm. In some examples, another of the distinguishing elements comprises a linear length of about 1.8 mm.

In an additional aspect, an encoder comprises an optically opaque support and a plurality of optically transparent gaps disposed in the body to provide a subset of an array of distinguishable elements of varying length present on the support, in which the varying length of the distinguishable elements is used to generate a code for a subset of the array of distinguishable elements.

In certain examples, the subset of the array comprises at least five distinguishable elements. In some embodiments, the subset of the array comprises at least seven distinguishable elements. In other examples, material of the optically opaque body between the gaps function as notches which are read to generate the code. In certain embodiments, the distinguishable features are arranged linearly on the support. In certain examples, the support is configured as a support that can move rotationally or linearly and be read. In other embodiments, the support comprises two or more lanes each comprising plurality of optically transparent gaps that provide a subset of an array of distinguishable elements of varying length. In some instances, the code provided by the subset of the distinguishable elements provides a discrete position of a device spatially coupled to the encoder. In further examples, the at least one of the distinguishing elements comprises a linear length of about 0.9 mm. In other embodiments, another of the distinguishing elements comprises a linear length of about 1.8 mm.

In another aspect, an encoder comprises an optically transparent support and a film coupled to a surface of the optically transparent support, the film comprising spaced markings that provide a subset of an array of distinguishable elements of varying length present on the support and coupled film, in which the varying length of the distinguishable elements is used to generate a code for a subset of the array of distinguishable elements.

In an additional aspect, an encoder comprises a first optically transparent support and a second support coupled to the first support, in which the first support and the second support together provide a subset of an array of distinguishable elements of varying length present on the coupled supports, in which the varying length of the distinguishable elements is used to generate a code for a subset of the array of distinguishable elements.

Additional features, aspect, examples, configurations and embodiments are described in more detail below.

BRIEF DESCRIPTION OF THE FIGURES

Certain embodiments are described with reference to the accompanying figures in which:

FIG. 3 is a table showing a number of elementary combinations, in accordance with certain embodiments;

FIG. 4A is a table showing a maximum length sequence for one illustration and FIG. 4B shows a linear feedback shift register, in accordance with certain examples;

FIGS. 5A and 5B are illustrations for an example where B(2,3) sequence is shown and where the De Bruijn sequence in FIG. 5B (for k=2, n=3) is 01011100;

FIGS. 11-13 show the full STAPLE code for $N_e=240$, $N_s=2$ and $N_c=7$, in accordance with certain examples;

Figure 1:
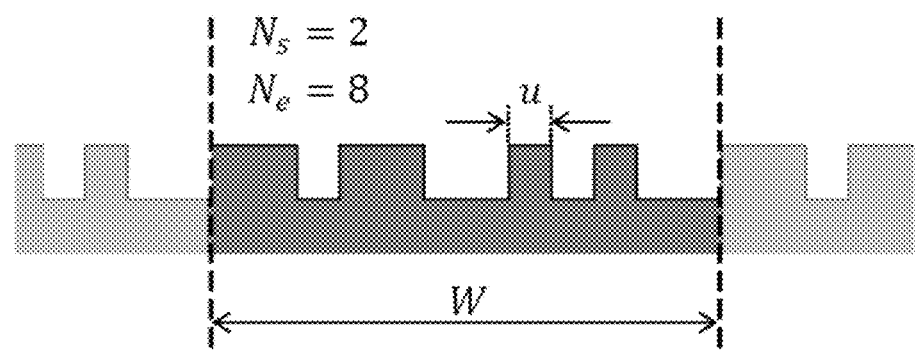
FIG. 1 is an illustration of distinguishable features arranged on a support, in accordance with certain examples, in which the number of distinguishable elements equals 2, and the length of each element can take one of two distinct values.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. No particular length, diameter or thickness, is intended by the depictions in the figures, and relative sizes of the figure components are not intended to limit the sizes of any of the components in the figures. Where dimensions or values are specified in the description below, the dimensions or values are provided for illustrative purposes only.

DETAILED DESCRIPTION

Certain embodiments are described below with reference to singular and plural terms in order to provide a more user friendly description of the technology disclosed herein. These terms are used for convenience purposes only and are not intended to limit the encoders and their use as including or excluding certain features unless otherwise noted as being present in a particular embodiment described herein. The term "associationally coupled" is used in certain instances to refer to a particular position or subset of an encoder being correlated or capable of being correlated to a specific position on a support of another device. For example, a subset of features on an encoder can be read to determine their code, which provides an absolute position of a site or position of another associationally coupled to that subset. This spatial coupling of a subset of the encoder with an absolute position of another device provides independent feedback regarding the absolute position of the other device, e.g., the absolute position can be determined without the need to calibrate the system and/or return to an initial or "zero" position.

In certain configurations, increased resolution may be achieved using the encoders and encoding methods described herein. For example, by monitoring the movement of a motor (e.g., by counting the steps in a stepper motor) in combination with reading of the code of the encoder, improved resolution may be achieved compared to just monitoring movement of the motor by itself. For example, in certain instances where a stepper motor is used to move a device associated with the encoder, micro-steps between the various elements of the encoder can be counted to provide for better spatial resolution. For example, the resolution of the encoding may be selected by selecting the length of the elements on the encoder support and/or by using smaller length elements that are detected, e.g., as long as the length of the elements on the encoder support can be detected, then any desired length can be used. Where a stepper motor is present and used with the encoders described herein, the smallest motor step can be configured as less than the smallest encoder element size (the basic unit). For microstep sizes smaller than the encoder basic unit, length encoding resolution can be said to improve to this microstep size. To further enhance resolution, proper motor control (PID, etc.), aimed at putting the motor at some prescribed intermediate position between encoder elements may be used.

In certain configurations, an encoder that includes distinguishable elements arranged in a support may be used to provide a code. The terms distinguishable elements or distinguishable features refer generally to two or more components on the support (or one component on the support and a component of the support itself) which can be distinguished from each other using a suitable sensor or signal. For example, in one configuration, one distinguishable element may be opaque, e.g., can block a sensor signal, and the other element can be transparent, e.g., may pass a sensor signal. In some instances, the distinguishable features may be labeled as "odd" or "even." In some configurations, odd codes are codes that start with an opaque element (e.g., a notch, marking, a line or another element that can block the sensor signal), and even codes start with a transparent element (e.g., a 'gap' of the support that can permit passage of a sensor signal for detection). In some cases, odd/even refers to the index number of each element in the entire 'plurality of arranged elements' (the whole sequence), which typically would begin with a 'notch'. The distinguishable features or elements can be used to provide a desired code. For example, the size or length of the elements may be measured and/or distinguished over a particular subset of features to provide a code. These length values can be the digits of the code. If two different lengths ($N_s=2$) can be distinguished, then the digits may be considered bits, and the code words may be considered binary numbers. In case of an implementation with more length values ($N_s=q$; $q>2$) digits will have base q and the code words will be q-ary numbers, e.g., ternary numbers for $N_s=3$. The code block size ($N_c$) is the number of digits (=elements) which taken together forms a single code. The number of distinct codes (and therewith the resolution of the system) increases with increasing code block size.

As described in more detail below, the code can be used to determine a position of a device or support associated with the determined code. For example, an encoder can be designed such that each code within a region or sector of the encoder corresponds to a position of a device used with the encoder. Reading of the code at any position of the encoder provides the exact position of the device used with the encoder. Reading of the code also permits position determination of the device without the need to calibrate the device or to return to a "zero" or initial position between position determinations.

In some instances, the encoder comprises an array of distinguishable elements of varying length present on a support. The distinguishable elements may be present as a component disposed or integral to the encoder support or as part of the encoder support itself. For example, a material can be disposed on a support with spaces between the material to provide a defined pattern of a certain length, e.g., where the disposed material and/or any gaps between it provide a pattern whose elements each include a certain length. The varying length of the distinguishable elements can be used to generate a code for a subset of the array of distinguishable elements. In some instances, 1, 2 or 3 different distinguishable elements may be present on the encoder support. In certain configurations, each subset of the array may comprise at least two, at least three, at least four, at least five, at least six or at least seven distinguishable elements to provide a corresponding code number, e.g., where 7 distinguishable elements are present in a subset a 7-digit number is provided as the code. In some instances, the distinguishable elements can be configured as line or notches and/or gaps. As noted herein, lines or notches generally block a signal from receipt by a sensor, whereas gaps permit receipt of a signal by a sensor. As the sensor scans in a linear direction and reads the notches and gaps, a length of the read notches and gaps can be used to determine the code of the subset using one or more encoding methodologies. The length and arrangement of the notches and gaps can be varied within a selected region of the encoder to provide a unique code for each subset within that region.

In certain examples, the encoding may be performed by considering an array of square notches of equal height, each followed by a gap separating it from the next notch (except for the last gap, which is the final element in the array). Notches and gap lengths can be restricted to the same discrete set of values:

$$w_i = s_i \cdot u \quad s_i \in \{1, 2, \ldots, N_s\} \quad (1)$$

All lengths can be multiples of the smallest notch/gap length. If the total number of elements—notches and gaps—in the array is denoted by $N_e$, then the total length of the array is given by $$W = \sum_{i=1}^{N_e} w_i = u \sum_{i=1}^{N_e} s_i \quad (2)$$

Figure 2:
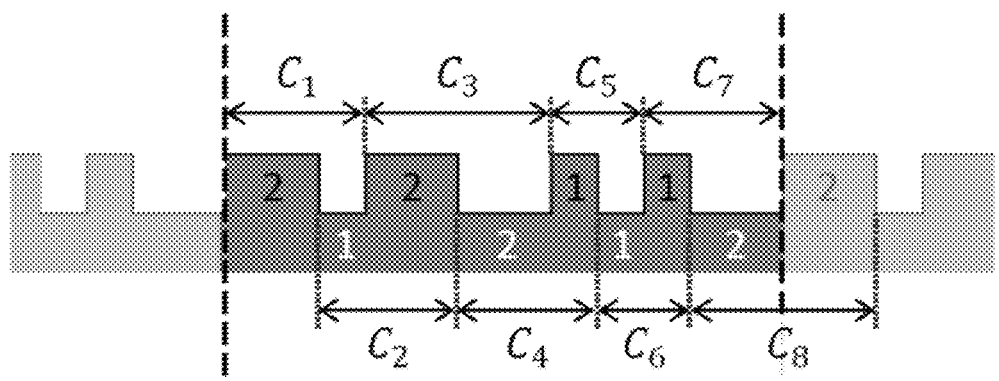
FIG. 2 is the illustration of FIG. 1, in which any two consecutive distinguishable elements form a unique code

Since notches and gaps come in pairs, $N_e$ is necessarily an even number. An example is presented in FIG. 1, in which the array is cyclically repeated beyond its boundaries. In this example, 8 unique blocks of 2 consecutive elements exist in the pattern. For 2-element blocks and $N_s=2$, this is an optimal solution. All possible 2-element codes are represented, as illustrated in FIG. 2. If defined periodically, the number of codes equals the number of array elements $N_e$. Generally, if codes of length $N_c$ ($N_c$ consecutive elements forming a single code block or word) are considered, for $N_s$ distinct element sizes, then the number of possible unique codes is given by No. of Codes=$2 \times N_s^{N_c}$. Therefore, the theoretical upper limit for the total number of elements $N_e$ of a cyclic array, for which every subset of $N_c$ elements constitutes a unique code, is equal to the number of possible codes:

$$N_{e,max} = 2 \cdot N_s^{N_c} \quad (3)$$

In this case, all possible codes are represented in the array and therefore, since no preference exists for any specific notch/gap size, all sizes appear in equal amounts. This enables a calculation of the total number of basic units (with a basic unit being define as the size of the smallest element in the array, i.e., the mechanical resolution of the system) in the array:

$$N_u = \frac{N_s + 1}{2} N_{e,max} = (N_s + 1) N_s^{N_c} \quad (4)$$

Two types of resolution can now be defined, which might be referred to as incremental and absolute: the length of a notch/gap and the length of a code word, respectively. Measured relative to the total array length W, they become:

$$\text{average:} \begin{cases} r_i = \dfrac{1}{N_{e,max}} = \dfrac{1}{2N_s^{N_c}} \\ r_a = N_c \cdot r_i = \dfrac{N_c}{2N_s^{N_c}} \end{cases} \quad (5)$$

$$\text{worst case:} \begin{cases} r_i = \dfrac{N_s}{N_u} = \dfrac{1}{(N_s+1) N_s^{N_c-1}} \\ r_a = N_c \cdot r_i = \dfrac{N_c}{(N_s+1) N_s^{N_c-1}} \end{cases}$$

The average resolutions are based on averaged element sizes, the worst case resolutions on the largest element sizes in the array. A number of elementary combinations $\{N_s, N_c\}$ are explored in the table of FIG. 3. All resolutions are worst case.

Equation (3) offers the amount of possible codes for a given combination $\{N_s, N_c\}$. Since consecutive codes always share the bulk (all except the outermost) of their digits, it is by no means trivial to construct or even prove the existence of a cyclic array of elements encompassing this maximum amount (or some smaller number) of unique codes. In certain examples, a body of theory exists concerning the existence and generation of cyclic sequences over an alphabet of k (corresponding to NO distinct symbols, for which every (connected) subsequence of a given size n (corresponding to NJ is unique. Two existing approaches of particular relevance will now be considered.

The maximum length sequence (MLS), or m-sequence, is a binary sequence where k=2 of length 2n−1, which is in fact not exactly 'maximum length', for the number of possible codes of length is 2n. See Reference 2. The missing code is always the decimal number 0 (all 0's, binary). See Reference 3. An MLS can be generated by a Linear Feedback Shift Register (LFSR) (see FIG. 4B), which repeatedly applies a linear transformation to a subset of the code bits to generate the additional bit of the adjacent code. Any transformation will necessarily yield a cycle of some length, but for a special class of linear transformations, the resulting cycle is 'maximal'. An MLS for n=3 is shown in the Table of FIG. 4A.

Any sequence consisting of all ($k^n$) possible subsequences of size n is called a De Bruijn sequence, after Nicolaas Govert de Bruijn, who (co-)developed the theory of these sequences. See References 1 and 2. De Bruijn sequences exist for all (k,n) in vast numbers, for the number of distinct De Bruijn sequences equals:

$$N_B = \frac{(n!)^{k^{n-1}}}{k^n} \quad (6)$$

Construction of a De Bruijn sequence can be accomplished by setting up a De Bruijn graph, a directed graph which contains a node for each of the $k^{n-1}$ possible codes of size n−1. From each node, k edges depart to the nodes corresponding to a left shift by one position of the root node, for all k possible alternatives for the rightmost position. An edge is marked by the value of the rightmost position of its destination node. A De Bruijn sequence B(k,n) can now be composed by following an Eulerian cycle through the graph, visiting all the $k^n$ edges exactly once while picking up the symbols attached to each edge. Alternatively, by following a Hamiltonian cycle, visiting all nodes exactly once, a B(k,n−1) De Bruijn sequence can be constructed from this graph. Since every node has an even number of edges (2k), an Eulerian cycle is guaranteed to exist and it can easily be constructed through one of several available algorithms to this end. An example for a B(2,3) sequence is shown in FIGS. 5A and 5B where the De Bruijn sequence in FIG. 5B (for k=2, n=3) is 01011100.

Figure 6A:
FIGS. 6A and 6B show a comparison of two encoding methods, in accordance with certain examples.
Figure 6B:

As noted herein, De Bruijn sequences can be used to assign a unique code to all subsets (of given length) of distinguishable elements of the array. The code units in other systems correspond to discrete, equidistant positions (representing notch/gap values), whereas the code units used in the encoding methods herein represent element sizes and the notch/gap attribute is derived from the (odd/even) unit index within the sequence. As a result, the methodology described herein can, in principle, be founded on any q-ary alphabet. The maximum number of contiguous notch (111 . . . ) or gap (000 . . . ) positions can never exceed k (which is independent of code size) in the encoding system described herein, while it is bounded only by n (the code size) in systems based on position encoding, requiring extension of the detection mechanism with increasing code size to maintain a unit-length resolution. To underscore the difference, an exemplary illustrative comparison is shown in FIGS. 6A and 6B. For a similar arrangement of notches and gaps, the position encoding systems are more complicated.

In certain embodiments, direct application of the aforementioned code generation methods to the (physical elements in the) cyclic arrays used by single track absolute positioning by length encoding (STAPLE) would be possible, but may be sub optimal, for it would not discriminate between notches and gaps and require all codes to be different, irrespective of the 'color' of their digits. Effectively, this would come down to a 50% efficiency reduction (losing the factor 2 in equation (3)).

To improve the approach, the codes can be divided into two interweaved subsets: 'odd' and 'even' codes, referring to the starting index of each code. All codes within the same subset can be unique, e.g., all codes within a subset are unique, but between the subsets duplicate codes are allowed, because these can be discerned based on the 'color' of their first element (notch or gap). Since a De Bruijn sequence can be an optimal solution to the standard encoding problem, two interlaced De Bruijn sequences of equal length (for the odd and even subsets), provided they exist, would be a solution to the encoding challenge for a system with 'odd' and 'even' code subsets.

Figure 7A:
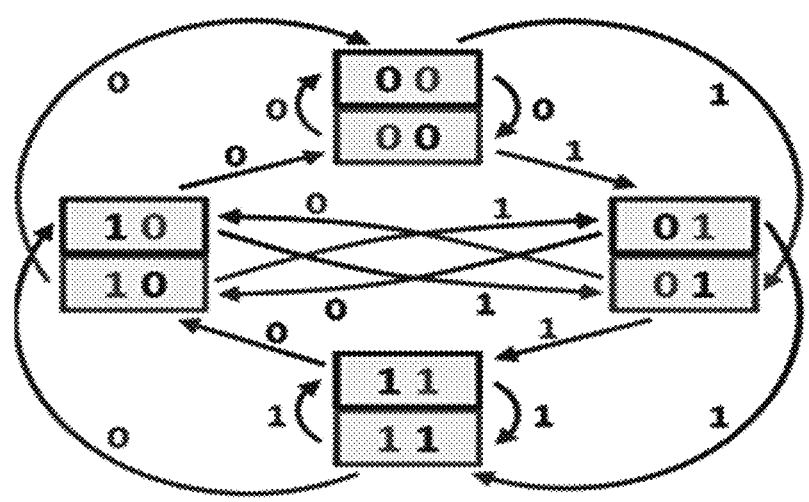
FIG. 7A shows a pair of De Bruijn graphs, out of which an interweaved De Bruijn sequence is constructed in FIG. 7B, in accordance with certain examples.
Figure 7B:
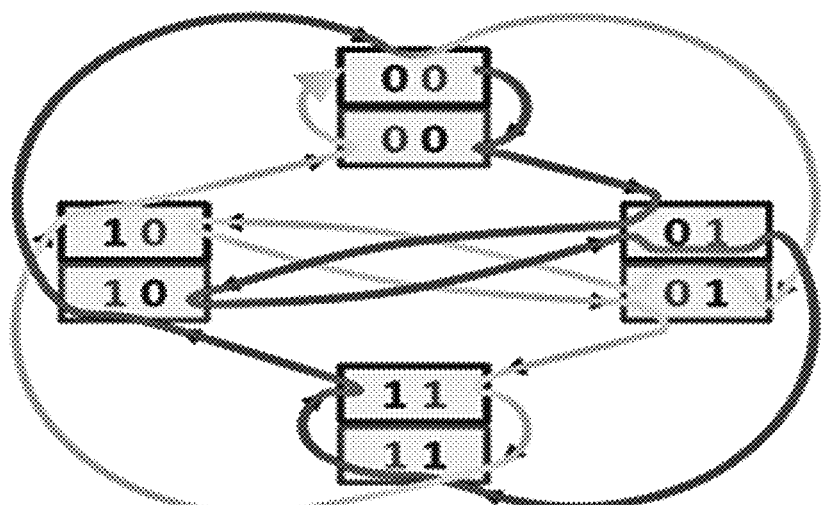

For example, a pair of interweaved De Bruijn sequences can always be constructed, by virtue of the 1-cycles at '00 . . . 00' and '11 . . . 11' which are common to all De Bruijn graphs. These cycles can serve as hinges, connecting the 'odd' and 'even' passes over the graph, as demonstrated in FIG. 7 (where the interweaved De Bruijn sequence in panel B (k=2, n=3) is determined to be 0010111001011100). It is possible to generated interweaved Dr Bruijn sequences of length 2 times $k_n$, fitting the proposed model, for all combination (k,n).

In certain instances, a De Bruijn sequence might in fact not be the optimal encoding solution, for it leaves no freedom in choosing the sequence length. Over the past decades, the subject of arbitrary length 'single track' codes has received some attention. See References 6-8. A general, optimized solution to this problem, however, has not (yet) been found. A solution for a sequence of (non-maximal) length L may be considered optimal if the following condition is met:

$$k^{n-1} < L \leq k^n \rightarrow n = \lceil \log_k(L) \rceil$$

If this condition is not fulfilled, a smaller code block size would suffice to generate L unique codes. Nevertheless, for given k and L, there's no guarantee that an optimal sequence exists, as can easily be verified for small, exemplary values.

One approach to the problem of constructing an optimal sequence of length L is to start from an (interweaved) De Bruijn graph and cut out a set of closed loops with a combined length of $k^n - L$. Cycles of any given length have a substantial probability of occurring in a De Bruijn sequence (for sufficiently large n). Since the number of distinct De Bruijn sequences is huge, according to equation (6), it is never too hard to find a sequence with the desired (combined) loop length (provided n is not too small).

Figure 8A:
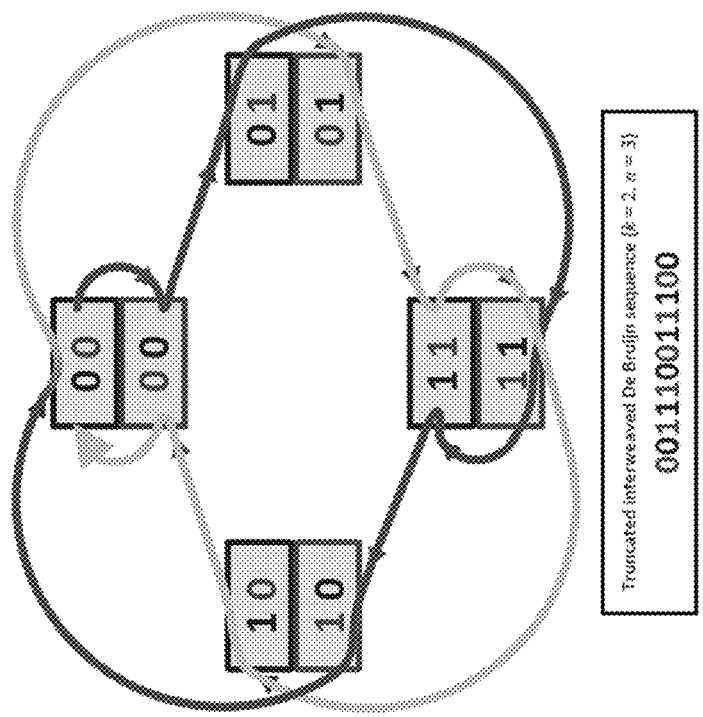
FIGS. 8A and B show an example where a 2-cycle is cut out from both branches of an interweaved De Bruin graph, in accordance with certain examples.
Figure 8B:
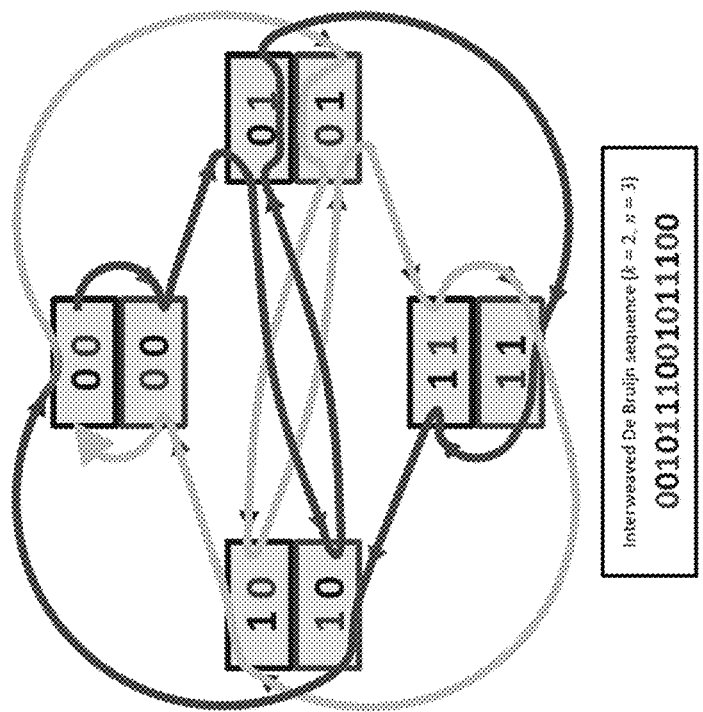

To illustrate this method, an example is displayed in FIG. 8, where a 2-cycle is cut out from both branches of an interweaved De Bruin graph to obtain a truncated interweaved De Bruijn sequence of length 12 (instead of maximum length 16). The interweaved sequence from panel A is 0010111001011100, whereas the truncated interweaved sequence from panel B is 001110011100 (where k=2, n=3 for both panels A and B).

In certain embodiments, the De Bruijn sequence methodology can be applied to shaft encoding or any encoding where a particular code of the encoder corresponds to a position of an associated support or other device. For example, where one code corresponds to a single position on a moveable support, detection of the code can provide an absolute position on the moveable support. This arrangement permits detection of any position on the moveable support (by code detection on the encoder) without having to return to a zero position or perform calibration routines from position detection to position detection.

Since an array defined as above consists of a sequence of (overlapping) unique code blocks, a 1-1 relationship exists between each code and its position in the array. If the array of notches and gaps is physically manufactured, detection of any single code block is sufficient for an absolute position determination. The principle is readily suitable for linear position encoding or rotational position encoding (shaft encoding). See References 4-12 for various encoding principles.

For rotational position encoding, the encoder array can be implemented on a circular disk, thereby effectively achieving its periodicity. The actual position determination might then take place, for instance, by optical detection of the distinguishable features on the disk, e.g., the notches, lines and/or gaps, or any other means capable of discerning a notch or line from a gap, e.g., using a magnetic sensor where the notches or lines comprise a magnetic or paramagnetic material. In addition to the theoretical differences mentioned herein, certain attributes setting STAPLE apart from existing systems exist. Since existing systems encode position rather than size (length), code bits of the same 'color' may form contiguous blocks whose size equals the code size. Therefore, reading the code with a single sensor is highly ineffective (or impossible) in these systems, for the worst case (incremental) resolution would be proportional to the code size. Consequently, systems working with single track code sequences using existing methodologies usually require an array of sensors rather than a single sensor. While this approach may permit a user to know the absolute position at all times without the need to perform an initial motion, it has the serious drawback of an ill-defined reading in the transition range between code bits. This can be (and in fact is) counteracted by applying single track Gray codes, but this is quite a cumbersome procedure, where the large spatial separation required for the detectors places high demands on the technical implementation.

As noted herein, STAPLE works, and can be used with only a single sensor or single detector. The use of STAPLE permits simplification of the system, lower cost and permits the use of fewer components subject to failure. An initial motion of a magnitude corresponding to the code block size can be used to acquire the absolute position, but the incremental resolution does not scale with the code size. Both incremental and absolute resolution can be further improved by adding detectors at fractional distances from the first detector (thereby circumventing the transition problem).

The choice for $N_s$ and $N_c$, the main parameters of the model, is driven by the specifics of the application, weighing the desired positional accuracy against mechanical requirements and detection limits. Translation to the physical parameters, for a sequence of maximum length, can be achieved through equations (3), (4) and (5). The basic unit size can be viewed as the mechanical resolution of the system (R is the disk radius).

$$u = \frac{2\pi R}{N_u} = \frac{4\pi R}{(N_s+1)N_e} \qquad (7)$$

In a concrete application, $N_u$ as obtained from equation (4) can be scaled down to a convenient value, in accordance with project dimensions, for instance 360 to arrive at a basic unit size of 1 degree, after which a matching truncated interweaved De Bruijn sequence of combined length $N_e = 360 \cdot [2/(N_s+1)]$ can be constructed.

In certain embodiments, a specific implementation for the case where $N_u = 360$ and $N_s = 2$ is described with reference to FIG. 9. According to equations (3) and (4), the corresponding number of elements is $N_e = 240$, with a minimum conforming code size of $N_c = 7$. Two truncated interweaved De Bruijn sequences of length 120 are used, derived from a De Bruijn sequence of length 128 ($2^7$). This sequence can be truncated to 120 by cutting out a set of cycles with a summed length of 8. Since the number of De Bruijn sequences to choose from is very large, some additional constraints may be imposed including: (a) the first (odd) code will be the decimal number 0, and (b) the sequence can be divided into s sectors of 240/s elements each (120/s notches and 120/s gaps) where all of the sectors have an equal length of 360/s. Part of a solution for s=10 is displayed in FIG. 9.

Figure 9:
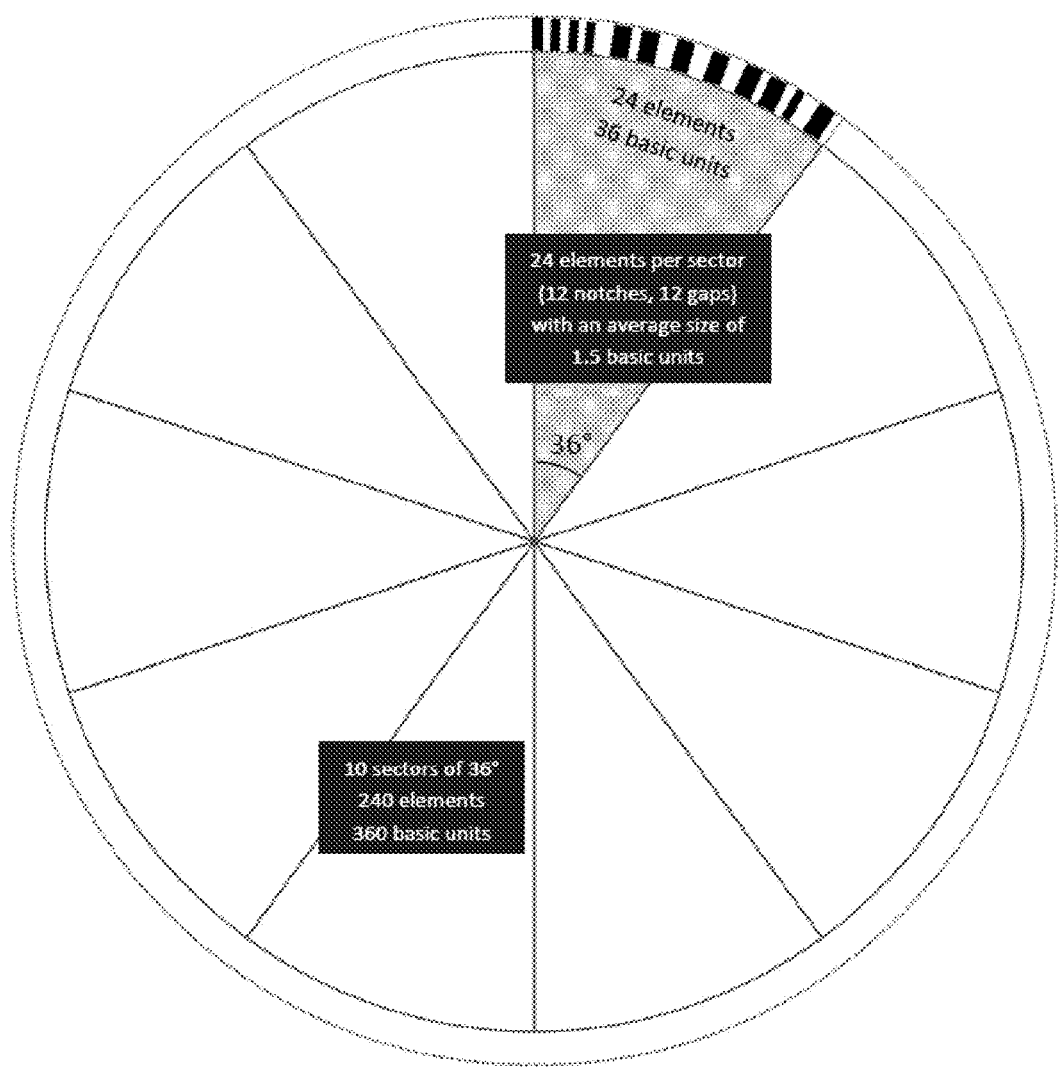
FIG. 9 shows part of a specific implementation for the case where $N_u=360$ and $N_s=2$, in accordance with certain embodiments.
Figure 10A:
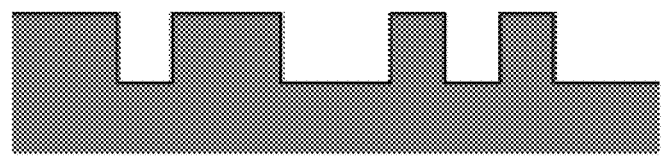
FIGS. 10A-10C show two consecutive, partially overlapping coding blocks or subsets, in accordance with certain examples.
Figure 10B:
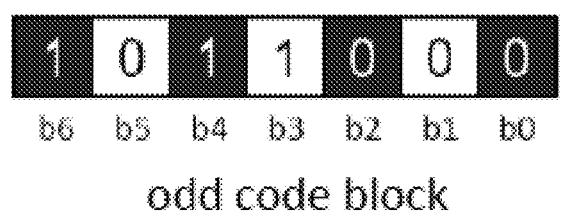
Figure 10C:
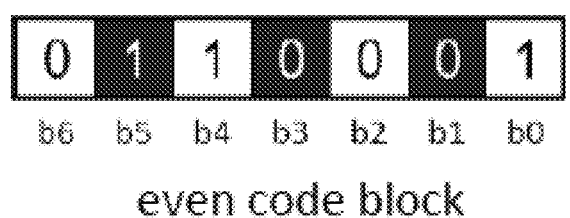
Figure 11:
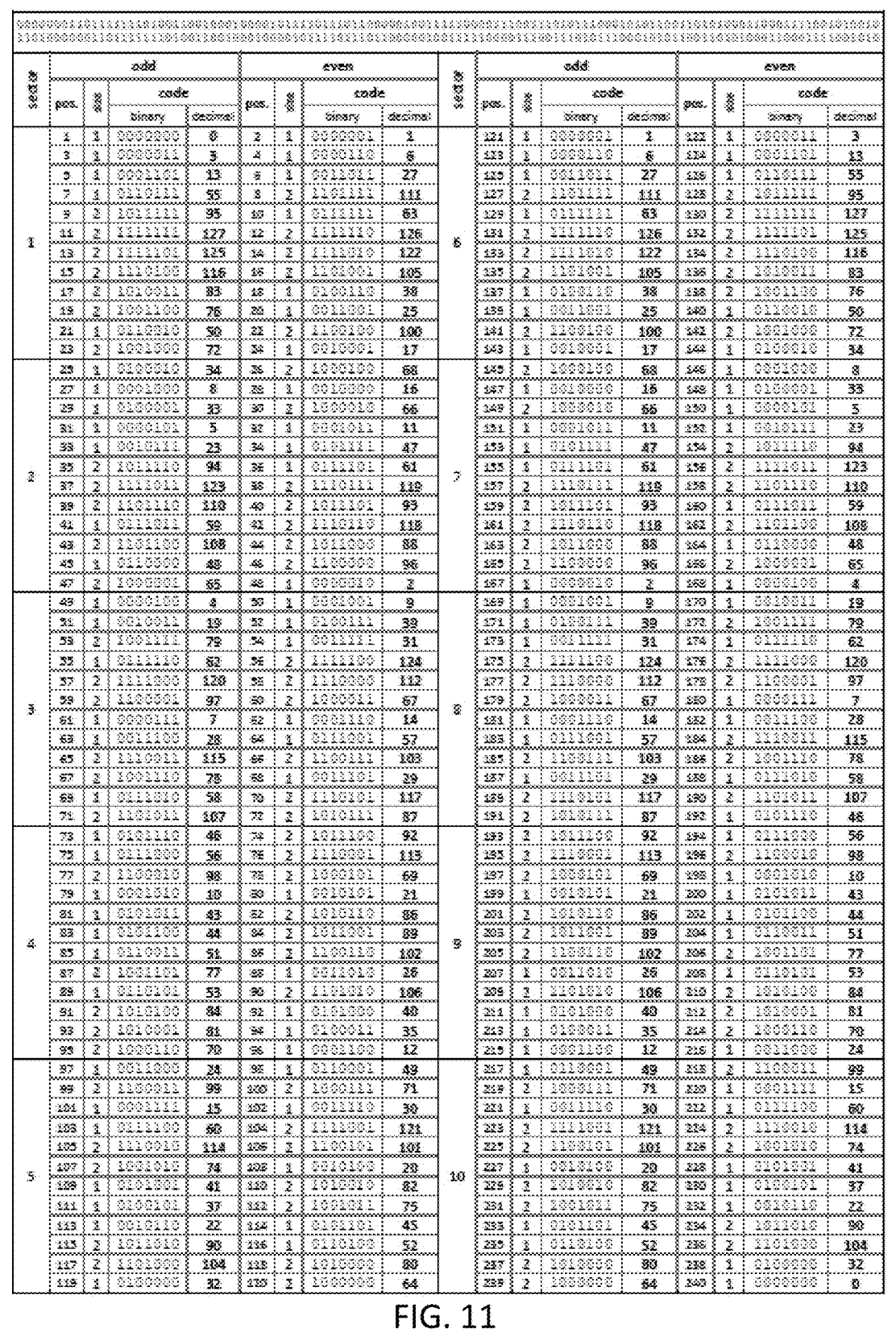
Figure 12:
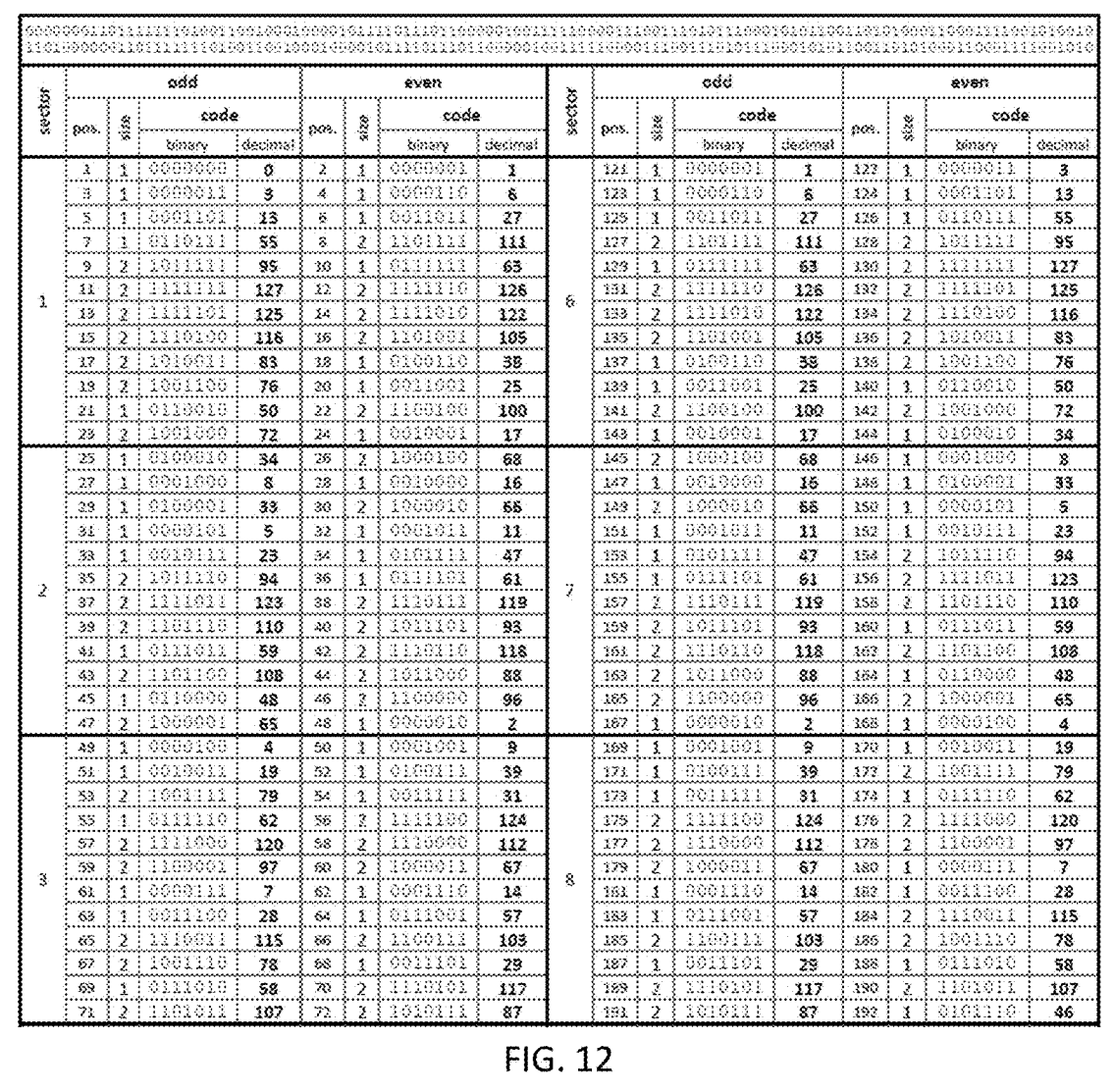

The notches are shown in FIG. 9 as black lines or blocks, and the gaps are shown as open space between the lines or blocks. For example and referring to FIGS. 10A-10C, a code block can conveniently be represented by a 7-bit binary number (0 corresponding to size 1, 1 to size 2). In "odd" codes the outer bits represent notches, in "even" codes they represent gaps The full STAPLE code for $N_e=240$, $N_s=2$ and $N_c=7$ is shown in FIGS. 11-13 with FIGS. 12 and 13 representing enlarged areas of FIG. 11. By coding the various blocks using the length of the notches and gaps, it is possible to determine an exact position of a device associated with the encoder without reverting back to an initial starting position and without the use of an array of sensors, e.g., a single sensor can be used to read the code and determine an exact position of the associated device.

Figure 14:
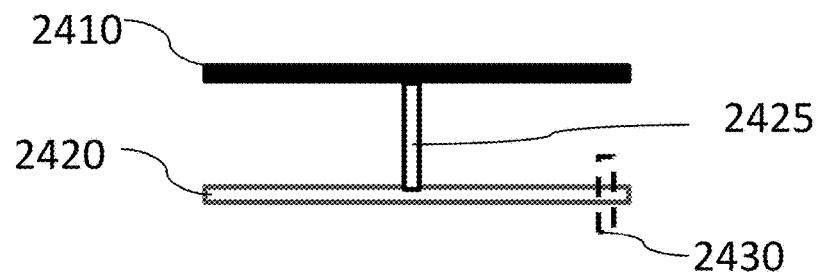
FIG. 14 is an illustration showing a support positioned above and coupled to an encoder, in accordance with certain examples.

In certain embodiments, the various distinguishable features described herein, e.g., line, notches and gaps can be arranged linearly on a support to permit linear reading of the encoder. In other instances, the notches and gaps may be arranged to permit rotation of the encoder and reading of the code during rotation. In some instances, either linear motion or rotational motion of the encoder also results in a corresponding movement of a device associated with the encoder. A simplistic illustration is shown in FIG. 14 that includes a support 2410 positioned above an encoder 2420. A sensor 2430 is shown that can read the length of the distinguishable features as the encoder is moved left to right. The encoder 2420 can be coupled to the support 2410 directly through a linkage or arm 2425 or can be coupled by other means, e.g., a lateral shaft, belt, actuator, etc. that causes movement of the support 2410 in about the same amount as movement of the encoder 2420. In some embodiments, the support 2410 and the encoder 2420 may move in the same direction, whereas in other instances, the support 2410 and the encoder 2420 may move in opposite directions, e.g., by using gears or other suitable devices. The sensor 2430 can read the features (not shown) on the encoder 2430 to determine the code. The determined code can be used to determine the exact position of the support 2410. While the encoder 2420 is shown as being positioned under the support 2410, the support 2410 may instead by under the encoder 2410.

In certain examples, the exact nature of the support 2410 and its use can vary. In some instances, the support can be used to receive packages and convey those packages to a desired position where they are sorted or removed. By knowing that a particular package is associated with a particular code (by virtue of the packages position on the support), the particular location of the package can be determined with accuracy. In other instances, the support may be configured to receive one or more electrical components that can be removed using a pick and place device, e.g., a pick and place device used to produce printed circuit boards or components including printed circuit boards. By placing the components at sites on the support and reading the associated code, the pick and place device can determine the exact location of the components at any time. In other instances, the support can be configured for use in an instrument to permit loading and unloading of samples, e.g., can be configured as an autosampler tray as described herein.

In certain embodiments, the encoders described herein can be used in connection with conveyor belt systems or similar systems that permit movement of a plurality of articles (and optionally sorting the articles) from one place to another. By spatially associated a subset of the encoder with a particular position on the conveyor belt, the absolute position of the conveyor belt at any instance can be determined by reading of the associated code. Where a package is sorted into a second belt or system, the code associated with the package can be updated to new code on an encoder present on a second encoder spatially associated with the second belt or system.

In instances where rotational movement of the support is desired, a support and encoder may be each constructed as a complete disk or a partial disk, e.g., semi-circle or a partial circle that is open at one end. Distinguishing features can be present on the encoder under the support disk that permits the system to determine a specific site of the support disk at any time. For example, each of the support disk and the encoder can be coupled to a stepper motor. While a certain number of steps on the motor should results in positioning of the support disk in a desired position, errors are often introduced that leads to aberrant positioning. By reading the code of a particular position from the encoder, feedback is provided to confirm that the stepper motor moved the support disk to the appropriate place. Without the use of an encoder, incorrect movement of the support disk often requires recalibration and/or returning the support disk to a "zero" position prior to being able to use the support for further analyses.

Figure 15:
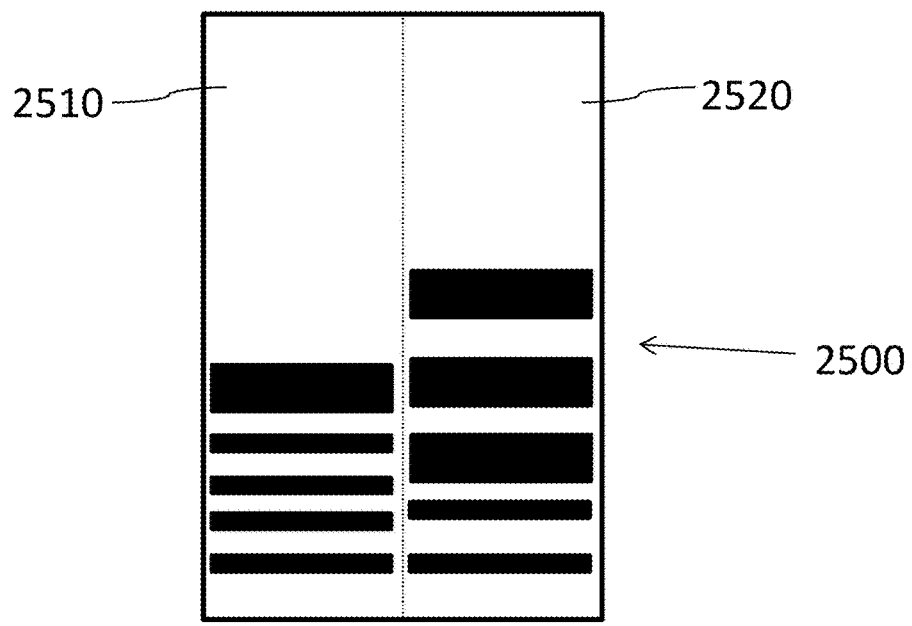
FIG. 15 is an illustration showing an encoder with two lanes, in accordance with certain configurations.

In certain instances, the support may comprise two or more lanes each comprising a subset of distinguishable features. For example and referring to FIG. 15, a top view of a linear plate encoder is shown with a first lane 2510 and a second lane 2520. Each of the lanes 2510, 2520 comprises notches and gaps that can be read to provide a code. For example, where an associated support device that is positioned above or below the encoder 2500 is present, the position of different lanes of the support device can be determined by reading the appropriate code of the encoder 2500. This permits samples, packages, articles, etc. to be loaded side by side in different lanes on the support device to provide an additional dimension of the support whose position can be determined. In some instances, an optical sensor, magnetic sensor, etc., can be used with the multi-lane encoder 2500. In other instances, an encoder configured as a circular disk (e.g., the disk of FIG. 9) can include multiple lanes as well, e.g., one lane on the outer edge of the disk and one or more additional lanes moving toward the center of the circle. While the distinguishable elements of different lanes are shown in FIG. 15 as being arranged in a different pattern and comprise different lengths, a similar code may be present in different lanes of the encoder if desired.

In certain embodiments, the encoders described herein can be produced using metal plates (aluminum plates or other metal plates), ceramic plates or other materials which can withstand harsh environments. For example, the encoders can be used in high temperature environments, e.g., above 100 degrees Celsius, above 200 degrees Celsius, or above 300 degrees Celsius, and still permit reading the code and position determination of an associated support. In some embodiments, thermal expansion effects of the distinguishing elements or features can be factored in to ensure the appropriate code is still present at each subset of the encoder. In some instances, the encoder may comprise suitable materials to permit the encoder to be used in caustic environments, acidic environments or other environments that may be used in various processing operations, e.g., microchip fabrication.

In certain examples, the exact length of the distinguishable features present on the encoder can vary. While use of a lesser length can potentially provide higher resolution and/or more subsets of features, for many applications very high resolution may not be needed. In some configurations, the notches and/or gaps may independently comprises a length of about 0.1 mm-3 mm, more particularly, about 0.5 mm to about 2 mm, for example, about 0.9 mm to about 1.8 mm. As noted herein, the length of the notches and gaps can be used to determine the particular code of the subset comprising a desired number of notches and gaps.

In some examples, the encoder may be produced by machining, depositing, scribing, laser etching, chemical etching or using other processes which can create features that block a sensor signal and/or features which pass a sensor signal. The ability to use a single sensor with the encoders described herein simplifies encoder constructions and permits the use of lower cost encoders that still retain suitable resolution.

In certain applications, the encoders described herein can be used within an instrument configured to perform one or more of thermal analysis, thermal gravimetric analysis, chromatography, gas chromatography, liquid chromatography, optical absorption, optical transmittance, mass spectrometry, an instrument comprising an atomization source, an instrument comprising an ionization source, an instrument comprising a flame, an instrument comprising a plasma and combinations thereof. In some examples, any of these instruments may comprise an autosampler tray (as noted herein) with a plurality of different positions. Using the encoder to determine the absolute position of the autosampler tray at any time increases the overall precision of these instruments.

In other applications, the encoders described herein can be used to determine the position of fluid containers, vehicles, automotive components, microprocessor components, electrical components, packages or other articles and devices which are often moved from one place to another in a linear or rotational manner.

In additional configurations, the encoders described herein may take the form of a comprising a plurality of arranged distinguishable elements on a support, in which the distinguishable elements can be detected and used to identify a discrete position based on a code generated for a subset of the plurality of arranged distinguishable features on the support, in which each of the arranged distinguishable elements comprises an independent defined length that is used to generate the code. In some instances, the device is used to determine a discrete position of a support device coupled to the encoder or associated spatially with the encoder. For example, the selected position is a particular sample holding position of an autosampler tray. In some examples, the codes can be divided into two interweaved subsets as noted herein. For example, one of the two interweaved subsets is an odd subset and the other of the two interweaved subset is an even subset. In some instances, each code generated for the odd subset is a unique code. In other instances, a code generated for the even subset is duplicative of a code generated for the odd subset. In further examples, the code generated for the subset is generated using a De Bruijn sequence. In other examples, the code generated for the subset is generated using two interweaved De Bruijn sequences. In additional configurations, the two interweaved De Bruijn sequences are of equal length. In some embodiments, the code generated for the subset is generated using an interweaved De Bruijn graph and by removing a set of closed loops with a combined length. In some configurations, the distinguishable features are lines and gaps and the code is assigned based on the length of the lines and the gaps on the support. In other configurations, the lines are configured to block an optical signal and the gaps are configured to permit passage of an optical signal. In some embodiments, the length of time the optical signal is blocked and passed is used to determine the code of the subset. In certain examples, a first length of the optical signal (passed or blocked) is defined as a 0 in the code and a second length of the optical signal (passed or blocked), greater than the first length of the optical signal, is defined as a 1 in the code. In some embodiments, the device may comprise a single detector configured to read the code by detecting the distinguishable features on the support. For example, lines and gaps are present on the support in a defined pattern to provide the subset of distinguishable features. In certain instances, the single detector is an optical detector, a magnetic detector or other detectors which can distinguish the features. For example, the optical detector may comprise an optocoupler or a detector that is configured to receive light when a gap is positioned adjacent to the detector and is configured to not receive light when a line is positioned adjacent to the detector. In some examples, the support is configured as a metal plate, a metal alloy plate, a plastic plate, a glass plate, a ceramic plate, a linear support, a C-shaped support or a support comprising a metal, metal alloy, plastic, glass, ceramic, rigid or flexible material.

In certain examples, the methodology described herein can be used to assign a code. For example, a code can be assigned based on length of distinguishable features present in a subset of a support. In some instances, a length of each distinguishable feature present in the subset is detected and assigned a code based on the length of the detected distinguishable features, e.g., a 3-digit code, a 5-digit code or a 7-digit code. In certain configurations, each subset of a region of the support with a different arrangement of distinguishable features to provide a unique code for each subset present in the region of the support. In other instances, a subset in a different region of the support can be configured with the same code as a subset present in the region, e.g., so the same code is present in different subsets of a single encoder. In some examples, each subset present on the support may be configured with a different arrangement of distinguishable features to provide a unique code for each subset present on the support, e.g., each code present on the single encoder is a unique code. In certain examples, the distinguishable features may comprise notches, lines or both notches and lines. As noted herein, to assign a code to a particular subset, two interweaved De Bruijn sequences can be used.

In other configurations, the encoders may be used in a method comprising detecting a length of a subset of distinguishable features on an encoder support to determine a code of the detected distinguishable features and to determine a position of the article support associated with the determined code of the encoder. For examples, each of a plurality of codes of the encoder can be coupled to (or associated with) a single position on the article support to permit determination of the exact position of the article support by reading the code. In some instances, detecting the length of notches and gaps as the distinguishable features on the encoder permits such position identification. For examples, the length of at least three, four, five, six or seven (or more) linearly arranged notches and gaps in the subset can be detected to determine the code of the subset. In some examples, notches or gaps of a first length can be assigned a code of 0 and notches or gaps of a second length, greater than the first length, can be assigned a code of 1. In other examples, a plurality of different subsets within a selected sector or region of the encoder support can be present to provide a unique code for each subset within the selected sector or region. If desired, the code of a subset present in the selected sector or region can be duplicated in a different selected sector or region of the encoder support. In other instances, the code can be configured as an odd code where an outer digit represents a notch on the encoder support or can be configured as an even code where an outer digit represents a gap on the encoder support. In some examples, each subset is configured with notches and gaps to provide a 7-bit binary number as the code, in which a bit of zero corresponds to a length of 1 unit and a bit of 1 corresponds to a length of 2 units.

In certain embodiments, a system can include an article support coupled to an actuation device configured to move the article support in selected increments to move the article support from a first position to a second position. The system may also include an encoder coupled to the actuation device, in which the encoder and the article support are associationally coupled such that movement of the article support from the first position to the second position causes movement of the encoder by about a same number of increments used to move the article support from the first position to the second position, in which the encoder comprises an array of distinguishable elements of varying length present on an encoder support, in which the varying length of the distinguishable elements is used to generate a code for a subset of the array of distinguishable elements, in which each generated code is associated with a position of the article support to permit reading of the code and determination of an exact position of the article support.

In certain examples, the actuation device is configured as a stepper motor. For example, the stepper motor is configured to rotate the article support and the encoder. In some examples, the stepper motor is configured to linearly translate the article support and the encoder. In other embodiments, the system can include a sensor configured to detect the code of the subset of the encoder support. In certain examples, the sensor is configured as an optical sensor or a magnetic sensor, e.g., the notches may comprise a magnetic or paramagnetic material that can be detected. In some embodiments, the encoder support comprises an arrangement of notches and gaps for the subset, in which the notches are configured to block receipt of light by the sensor and the gaps are configured to permit passage of light to the sensor, in which the blockage and receipt of light by the sensor are used to determine the length of the notches and gaps present in the subset of the encoder support. In other configurations, the encoder support comprises a plurality of regions or sectors. In some instances, each subset of distinguishable features present in a region or sector of the encoder support are arranged to provide a unique code. In certain embodiments, the encoder support is configured as a plate comprising at least one of a metal, a glass, a ceramic, a plastic and combinations thereof. In some examples, the system may comprise a second actuation device coupled to the article support. For example, the second actuation device can be configured to move the article support up and down (along a longitudinal axis of the system) and the actuation device is configured to move the article support rotationally or linearly (relative to a longitudinal axis of the system). In some examples, the encoder can be coupled to the actuation device in a plane below the article support or can be coupled to the actuation device in a plane above the article support. In certain embodiments, the article support and encoder are configured for use in a system where the article support receives packages in a package sorting system. In certain examples, the article support and encoder are configured for use in a packaging system to identity a position of at least one component to be placed into a package. In other instances, the article support and encoder are configured for use in a pick and place device. In further examples, the article support and encoder are configured for use in an instrument configured to perform one or more of thermal analysis, thermal gravimetric analysis, chromatography, gas chromatography, liquid chromatography, optical absorption, optical transmittance, mass spectrometry, an instrument comprising an atomization source, an instrument comprising an ionization source, an instrument comprising a flame, an instrument comprising a plasma and combinations thereof. In other configurations, the encoder comprises a first lane and a second lane each comprising an array of distinguishable elements of varying length present on an encoder support.

In certain examples, the encoders can be produced using a support material and adding features to the support material or removing material or otherwise altering the support in some manner to provide distinguishable features on the support over a selected region or area. In some examples, a solid body that is generally opaque to a sensor signal can be used to produce a support material. Lines or gaps can be drilled, etched, machined or otherwise added to the solid body to provide gaps between the material of the support, e.g. the material of the support between the gaps functions as a notch or line. The length of the various gaps and support material can be used to provide a code for a particular number of features, e.g., three, four, five, six, seven, eight or more arranged features. As the sensor signal encounters the encoder support material, the signal is blocked at notches or areas comprising the support material and can pass to a detector of the sensor when the signal is at the gaps or lines in the encoder support material.

In other examples, the encoder support may be transparent to the sensor signal and material can be added, or areas of the encoder support can be altered, such that the sensor signal is prevented from arrival at a detector when the detector is reading those areas that or altered or include added material. For example, the encoder support may comprise a glass or optically transparent body that permits passage of light and light detection by a sensor. Etchings, markings or material can be deposited in the forms of notches or lines with a desired length to provide an arrangement of notches and transparent support material, which function as gaps between the notches. In producing such notches or gaps, a mask or overlay of a desired pattern and length of notches can be laid onto a top of the support, and material can be deposited, e.g., disposed, sputtered, electrodepositing, brushed on, painted on, coated on, etc. to provide the notches on the support. The mask can then be removed leaving behind the pattern of notches and gaps. The length of the different notches and gaps can be read using a sensor to determine the code of a subset of the elements.

Figure 16:
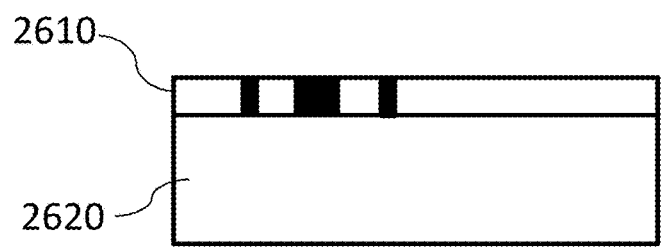
FIG. 16 is an illustration showing a film with markings disposed on an encoder support, in accordance with certain examples.

In other embodiments, an encoder support material may comprise a transparent substrate that is then coupled to a film comprising the distinguishable features. For example and referring to FIG. 16, a film 2610 comprising notches, markings, etc. of a selected length and arranged in a desired pattern can be disposed on top of the transparent support 2620 such that signals incident on the notches or lines of the film are blocked from receipt by the detector. The spaces between the notches or markings on the film 2610 function as gaps. The length of the different notches and gaps can be read using a sensor to determine the code of a subset of the elements. In some instances, the film 2610 can be laminated to the support, adhered to the support, bonded to the support, molded to the support, welded to the support or otherwise coupled to the support. In some embodiments, a film comprising notches and gaps may be present on each side of a transparent support to permit easier production of the encoder. For example, it may be difficult to produce the notches in close proximity with high precision. By placing some notches on one film and other notches on another film, and then coupling the films to the transparent support, the notches of the films can be offset to provide a desired overall code when the code is read with the encoder positioned in an x-y plane, e.g., the encoder is positioned between a light source and a detector with the light source and detector being substantially perpendicular to the planar area of the support to provide light from the bottom of the encoder support (through the encoder support) and to read the transmitted signal (or lack thereof where the signal is blocked) above the encoder support. If desired, the detector of the sensor could instead be positioned below the encoder support with the light source positioned above the encoder support.

In other configurations, two separate support materials can be coupled or fused to each other to provide the notches and gaps of the encoder. For example, one support can be optically transparent and the other support may comprise markings or notches. In other configurations, each of the supports may comprise markings or notches which can provide a code for a particular subset of the encoder. In some instances, both including notches and markings on two different support, the type and number of patterns and/or the spacing between notches and gaps can be better selected.

The exact type of light used with the encoder support can vary and includes, visible light, infrared light, ultraviolet light, X-rays, or other light which can be detected (or not detected) depending on the particular position of the encoder support relative to the position of the sensor. The light can be provided from a laser or from a lamp and can be collected using a sensor with suitable detection devices, e.g., a photomultiplier tube, diode, optocoupler, charge coupled device, a camera, a scintillation plate, etc. In some instances, the light used may have a wavelength greater than about 700 nm, e.g., 800-1000 nm, and the detector used can sense the presence and/or absence of the light within that wavelength range. The detector can be positioned such that stray or scattered light is not read to provide a false reading. The detector can include suitable filters and gratings to filter out all wavelengths of light except the desired wavelength to be read.

In certain embodiments, the encoders described herein can be used with a device or system comprising a computer or other device that includes a processor. The computer system typically is separate from the encoder, but a processor or other device may be integrated into the encoder if desired. The processor can be used, for example, to control the position of the encoder, to receive signals representative of the code of a subset or to otherwise permit the encoder to be spatially associated with another component. The computer system typically includes at least one processor electrically coupled to one or more memory units to receive data from the encoder. The computer system may be, for example, a general-purpose computer such as those based on Unix, Intel PENTIUM-type processor, Motorola PowerPC, Sun UltraSPARC, Hewlett-Packard PA-RISC processors, or any other type of processor. One or more of any type computer system may be used according to various embodiments of the technology. Further, the system may be connected to a single computer or may be distributed among a plurality of computers attached by a communications network. A general-purpose computer system may be configured, for example, to perform any of the described functions including but not limited to: encoder movement, code reading, code storage, lookup table processing, or the like. It should be appreciated that other functions, including network communication, can be performed and the technology is not limited to having any particular function or set of functions. Various aspects of the systems and methods may be implemented as specialized software executing in a general-purpose computer system. For example, a protocol configured to detect a code of a subset of the encoder can be implemented. The computer system may include a processor connected to one or more memory devices, such as a disk drive, memory, or other device for storing data. Memory is typically used for storing programs and data during operation of the computer system. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically is electrically coupled to a power source, the encoder, any motors or actuators which are present, etc. such that electrical signals may be provided to and from the computer and the coupled devices. The computer system may also include one or more input devices, for example, a keyboard, mouse, trackball, microphone, touch screen, manual switch (e.g., override switch) and one or more output devices, for example, a printing device, display screen, speaker. In addition, the computer system may contain one or more interfaces that connect the computer system to a communication network (in addition or as an alternative to the interconnection device). The computer system may also include suitable circuitry to convert signals received from the encoder and/or other components of the system. Such circuitry can be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth, WiFi, Near Field Communication or other wireless protocols and/or interfaces.

In certain embodiments, the storage system of the computer typically includes a computer readable and writeable nonvolatile recording medium in which codes can be stored that can be used by a program to be executed by the processor or information stored on or in the medium to be processed by the program. The medium may, for example, be a disk, solid state drive or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. For example, the processor may receive signals from the sensor that reads the code of a subset of the encoder to determine the position of a spatially associated device. A variety of mechanisms are known for managing data movement between the medium and the integrated circuit memory element and the technology is not limited thereto. The technology is also not limited to a particular memory system or storage system. In certain embodiments, the computer system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the computer system described above or as an independent component. Although a computer system is described by way of example as one type of computer system upon which various aspects of the technology may be practiced, it should be appreciated that aspects are not limited to being implemented on the described computer system. Various aspects may be practiced on one or more computers having a different architecture or components. The computer system may be a general-purpose computer system that is programmable using a high-level computer programming language. The computer system may be also implemented using specially programmed, special purpose hardware. In the computer system, the processor is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, Windows Vista, Windows 7, Windows 8 or Windows 10 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a computer platform for which application programs in high-level programming languages may be written. It should be understood that the technology is not limited to a particular computer system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate computer systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as SmallTalk, Basic, Java, C++, Ada, or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof.

In certain embodiments, the system comprising the encoder may take the form of (or interact with) a mobile device, e.g., a phone or a tablet, that is configured to control use of (or monitor use of) a system comprising an encoder. The mobile device may wirelessly communicate with the encoder system to send signals and receive signals or data from the system. In addition, the mobile device can be pre-programmed or pre-configured to implement certain operations that can automatically load from the mobile device into the system. If desired, the mobile device can be designed for use with two or more different systems to permit a single mobile device to implement the same or different operations on the two or more systems. The mobile device may be pre-loaded with the codes or a lookup table to assist in use of the encoder. The mobile device can couple to the encoder (or a system comprising the encoder) in a wireless manner, e.g., using near field communication, Bluetooth, or other wireless devices and protocols, to send and receive information from the mobile device to the encoder. One or more menus can be present on the mobile device to permit the user to select the particular methodology of using the encoder. In other instances, the system may comprise a display or touch screen that is designed to display a menu permitting operation of the system.

Certain examples are described below to further illustrate the technology disclosed herein.

Example 1

A possible generalization of the code system is described below, in which elements are no longer restricted to being of either one of two distinct types (notch or gap), but instead the number of distinguishable types equals some number $N_t$. In terms of physical elements and detection mechanisms, this would correspond to having a set of resolvable signal attenuation values rather than just 'all or nothing' For example, a setting with X-ray attenuation detection in combination with elements of varying thickness could provide two or more distinct types of elements.

This extension will now be developed further. In particular, the effect on the basic equations (3)-(5) of the model will be examined. Since adjacent element types should differ for the detector to be able to discern them, the only option for an $N_t=2$ system is alternating 'black' and 'white' (notch and gap). For any code word length this permits only two alternative code word types: 'odd' (starting with black/notch) and 'even' (starting with white/gap). For $N_t>2$ the concept odd/even loses its meaning, because the number of distinct code word types increases very rapidly with and with code word length, from which it is no longer independent. For given $N_t$ and $N_c$ the number of distinct code word types equals $$N_t(N_t-1)^{N_c-1}$$

yielding 2 for the (already explored) case $N_t=2$. This enables generalization of equations (3)-(5) for arbitrary $N_t$. The expression for the (maximum) number of elements now becomes:

$$N_{e,max} = N_t(N_t-1)^{N_c-1} N_s^{N_c} \tag{8}$$

Figure 17:
FIG. 17 is an illustration showing a full (maximal) code for one configuration, in accordance with certain examples.

This equation shows that the profit of increasing is substantial. In FIG. 17, an example of a full (maximal) code is given for $\{N_t, N_s, N_c\} = \{3,2,2\}$. The total number of elements ($N_e$) is 24, for a code length of only 2 elements (and 2 distinguishable element sizes).

Equations (4) and (5) can now be extended in a similar fashion. The number of basic units is given by:

$$N_u = \frac{1}{2} N_t (N_t-1)^{N_c-1} (N_s+1) N_s^{N_c} \tag{9}$$

The average and worst case incremental and absolute resolutions now become:

$$\text{average:} \begin{cases} r_i = \dfrac{1}{N_t(N_t-1)^{N_c-1} N_s^{N_c}} \\ r_a = \dfrac{N_c}{N_t(N_t-1)^{N_c-1} N_s^{N_c}} \end{cases} \tag{10}$$

$$\text{worst case:} \begin{cases} r_i = \dfrac{2}{N_t(N_t-1)^{N_c-1}(N_s+1) N_s^{N_c-1}} \\ r_a = \dfrac{2N_c}{N_t(N_t-1)^{N_c-1}(N_s+1) N_s^{N_c-1}} \end{cases}$$

Figure 18:
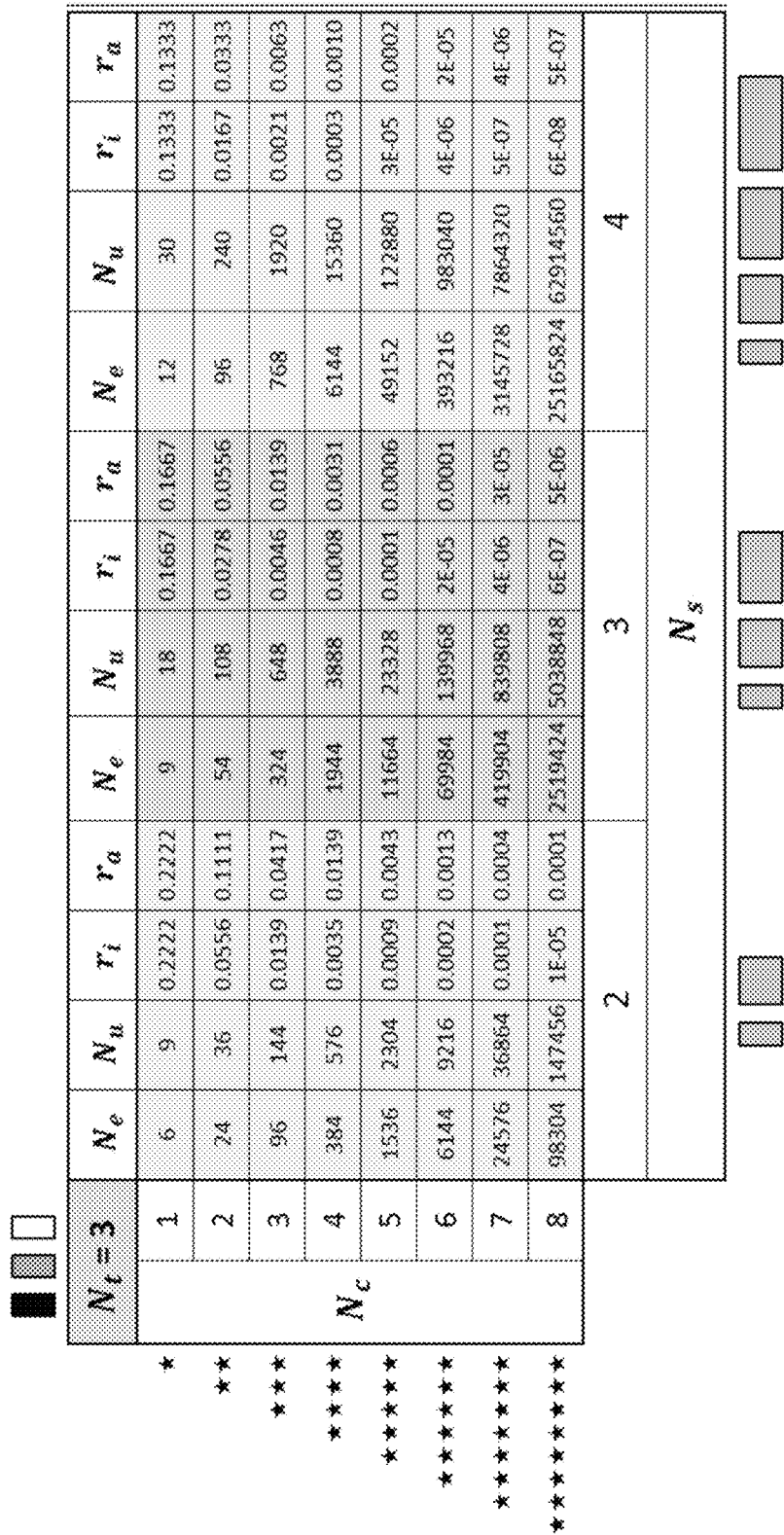
FIG. 18 is a table showing various parameters for a specific situation including an element other than just than notches and gaps, in accordance with certain examples.

The extension adds a dimension to the table of FIG. 3, which can now be viewed as the bottom layer of a stacked table for different values of $N_t$. As an example, the layer for $N_t=3$ is presented in FIG. 18. All resolutions are worst case. With this extension, the encoding task generally becomes more complex than for the special notch/gap case ($N_t=2$). Instead of finding a pair of interweaved De Bruijn sequences, the challenge is now to construct a set of $N_t(N_t-1)^{N_c-1}$ interweaved truncated De Bruijn sequences of equal length. However, the interweaving need not necessarily be performed 'homogeneously', the way it can for the notch/gap case, where odd and even codes follow a strictly alternating pattern. This adds a degree of freedom to the construction process, counteracting the increased complexity.

Certain references have been referred to herein and include:

Reference 1: De Bruijn, N. G. (1946)—A combinatorial problem—Koninklijke Nederlandsche Akademie van Wetenschappen, Proceedings of the Section of Sciences—v. XLIX, nr. 6-10, p. 758-764;

Reference 2: De Bruijn, N. G. and Van Aardenne-Ehrenfest, T. (1951)—Circuits and trees in oriented linear graphs—Simon Stevin—v. 28, p. 203-217;

Reference 3: Makino, Shigeru (1994)—Absolute encoder—Japanese Patent JPH06347288 (A)—filed 1994 Apr. 14, issued 1994 Dec. 20;

Reference 4: Agrawal, Amit and Thornton, Jay (2013)—Self-Calibrating Single Track Absolute Rotary Encoder—U.S. Patent US2013253870 (A1)—filed 2013 May 21, issued 2013 Sep. 26;

Reference 5: Urabe, Hideki (2009)—Optical Absolute Rotary Encoder—U.S. Patent US2009108188 (A1)—filed 2007 Sep. 28, issued 2009 Apr. 30;

Reference 6: Petriu, E. M. (1985)—Abolute-type pseudo-random shaft encoder with any desired resolution—Electronics Letters, v. 21;

Reference 7: i Fuertes, J.; Balle, B. and Ventura, E. (2008)—Absolute-Type Shaft Encoding Using LFSR Sequences With a Prescribed Length—Instrumentation and Measurement, IEEE Transactions on, v. 57, i. 5, p. 915-922;

Reference 8: Fuertes, J.; Balle, B. and Ventura, E. (2009)—Single-tracked shaft encoders with LFSR sequences of low combinatorial complexity—invited post ICM09 paper;

Reference 9: Schwartz, M. and Etzion, T. (1999)—The Structure of Single-Track Gray Codes—IEEE Transactions on Information Theory, v. 45, i. 7, p. 2383-2396;

Reference 10: Yinghao, Tan; Bo, Yuan and Zibo, Meng (2012)—Absolute shaft angle encoding system based on array detector—Chinese Patent CN102322882 (A)—filed 2011 Jun. 2, issued 2012 Jan. 18

Reference 11: Zhengang, Wang (2008)—Single-code track absolute angle coded circle and encoder using the same—Chinese Patent CN101153808 (A)—filed 2007 Sep. 19, issued 2008 Apr. 2; and Reference 12: Litao, Liang (2009)—Single-code channel absolute position encoding method—Chinese Patent CN101476902 (A)—filed 2009 Jan. 13, issued 2009 Jul. 8.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A encoder configured to couple to an autosampler tray, the encoder comprising a plurality of arranged distinguishable elements on the encoder, in which the distinguishable elements can be detected and used to identify a position based on a code generated for a subset of the plurality of arranged distinguishable features on the encoder, in which each of the arranged distinguishable elements comprises an independent defined length that is used to generate the code, wherein the code generated for the subset is generated using a De Bruijn sequence, and wherein the autosampler tray comprises a plurality of independent sites and the encoder is used to determine a position of the autosampler tray to identify an individual site of the plurality of independent sites of the autosampler tray.

2. The device of claim 1, in which the codes are divided into two interweaved subsets.

3. The device of claim 2, in which one of the two interweaved subsets is an odd subset and the other of the two interweaved subset is an even subset.

4. The device of claim 2, in which each code generated for the odd subset is a unique code.

5. The device of claim 1, in which in which the encoder and the autosampler tray are each coupled to a stepper motor.

6. The device of claim 5, in which the code generated for the subset is generated using two interweaved De Bruijn sequences, and wherein the device further comprises a processor configured to count a number of steps the stepper motor is moved.

7. The device of claim 6, in which the two interweaved De Bruijn sequences are of equal length.

8. The device of claim 1, in which the code generated for the subset is generated using an interweaved De Bruijn graph and by removing a set of closed loops with a combined length.

9. The device of claim 1, in which the code corresponds to a selected site of the autosampler tray.

10. The device of claim 9, in which the selected site is a sample holding position of an autosampler tray.

11. The device of claim 1, in which the distinguishable features are lines and gaps and the code is assigned based on the length of the lines and the gaps on the encoder.

12. The device of claim 11, in which the device comprises an optical sensor and wherein the lines are configured to block an optical signal from the optical sensor and the gaps are configured to permit passage of an optical signal from the optical sensor.

13. The device of claim 12, in which the optical sensor is configured to use a length of time the optical signal is blocked and passed is used to determine the code of the subset.

14. The device of claim 13, in which a first length of the optical signal is defined as a 0 in the code and a second length of the optical signal, greater than the first length of the optical signal, is defined as a 1 in the code.

15. The device of claim 1, further comprising a single detector configured to read the code by detecting the distinguishable features on the encoder.

16. The device of claim 15, in which lines and gaps are present on the encoder in a defined pattern to provide the subset of distinguishable features.

17. The device of claim 15, in which the single detector is an optical detector.

18. The device of claim 17, in which the optical detector comprises an optocoupler.

19. The device of claim 17, in which the detector is configured to receive light when a gap is positioned adjacent to the detector and is configured to not receive light when a line is positioned adjacent to the detector.

20. The device of claim 1, in which the encoder is configured as a metal plate, a plastic plate, a glass plate, a ceramic plate, a linear support, a C-shaped support or a support comprising a metal, plastic, glass, rigid or flexible material.

* * * * *